(12) United States Patent  (10) Patent No.: US 6,317,567 B1
Ichikawa et al.  (45) Date of Patent: Nov. 13, 2001

(54) CAMERA

(75) Inventors: Tsutomu Ichikawa; Hiroaki Minami, both of Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/394,872

(22) Filed: Sep. 13, 1999

(30) Foreign Application Priority Data

Sep. 14, 1998 (JP) .................................................. 10-260632

(51) Int. Cl.⁷ .................................................. G03B 17/24
(52) U.S. Cl. .......................................... 396/315; 396/321
(58) Field of Search ..................................... 396/315, 316, 396/317, 318, 321, 311, 310, 211

(56) References Cited

U.S. PATENT DOCUMENTS

| | | | |
|---|---|---|---|
| 5,142,310 | * 8/1992 | Tanighuchi et al. | 396/318 X |
| 5,579,067 | 11/1996 | Wakabayashi | 396/311 |
| 5,697,004 | 12/1997 | Saegusa et al. | 396/311 |

* cited by examiner

*Primary Examiner*—W. B. Perkey
(74) *Attorney, Agent, or Firm*—McDermott, Will & Emery

(57) ABSTRACT

In a camera system for exposing an image of an object in each frame on a film, an inherent film number is optically exposed in a predetermined region on the film which is disposed before a first frame and not exposed. Furthermore, all frame data such as shutter speed, aperture number, and so on with respect to all frames on the same film are recorded together in a file in a memory card. A name corresponding to the inherent film number is used as a name of the file.

20 Claims, 12 Drawing Sheets

CAMERA

This application is based on patent application Hei. 10-260632 filed in Japan, the content of which are hereby incorporated by references.

BACKGROUND OF THE INVENTION

1. Field of the Invention

This invention relates to a camera for taking an image of an object on a film, and especially relates to a camera which can memorize image taking information corresponding to each image of frame on a film into a memory.

2. Description of the Related Art

In a field of a camera for taking an image on a film, a data control system is proposed for memorizing image taking information such as shutter speed, aperture number, date when image was taken and so on with respect to each image of frame into a memory of a camera. In the conventional data control system, the image taking information memorized in the memory of the camera are directly taken into a personal computer when the camera is connected to the personal computer. The image taking information with respect to each frame on the same film are memorized together in the same information file by the personal computer. On the other hand, the images of the frames on the same film are taken into the personal computer by a scanner and memorized together in the same image data file. By linking the image data file and the information file corresponding to the same number of frames in the personal computer, the image taking information and the image data can effectively be controlled and recorded.

SUMMARY OF THE INVENTION

An object of this invention is to provide a camera or a recorder which can control data with respect to images on a film easily. Another object of this invention is to provide a camera or a recorder which can correspond a distinguishable information visibly recorded on a film to a file name of an image data file stored in a memory. Still another object of this invention is to provide a camera or a recorder which can add a distinguishable information on a film firmly. Still another object of this invention is to provide a camera or a recorder which can store information with respect to image taking operation into an internal memory when no external memory is connected thereto.

A camera in accordance with this invention exposes an image of an object in each frame on a film. The camera comprises an information marking device for marking an inherent information of the film in a predetermined region on the film, and an output device for outputting frame information with respect to each frame and the inherent information recorded on the film with a predetermined relation.

By such a configuration, the inherent information of the film such as a film number, an optional name, and so on can be marked. Furthermore, the frame information can be outputted with the inherent information, so that the image of the film can be arranged easily by using, for example, an electronic album.

DETAILED DESCRIPTION OF THE EMBODIMENT

Figure 1:
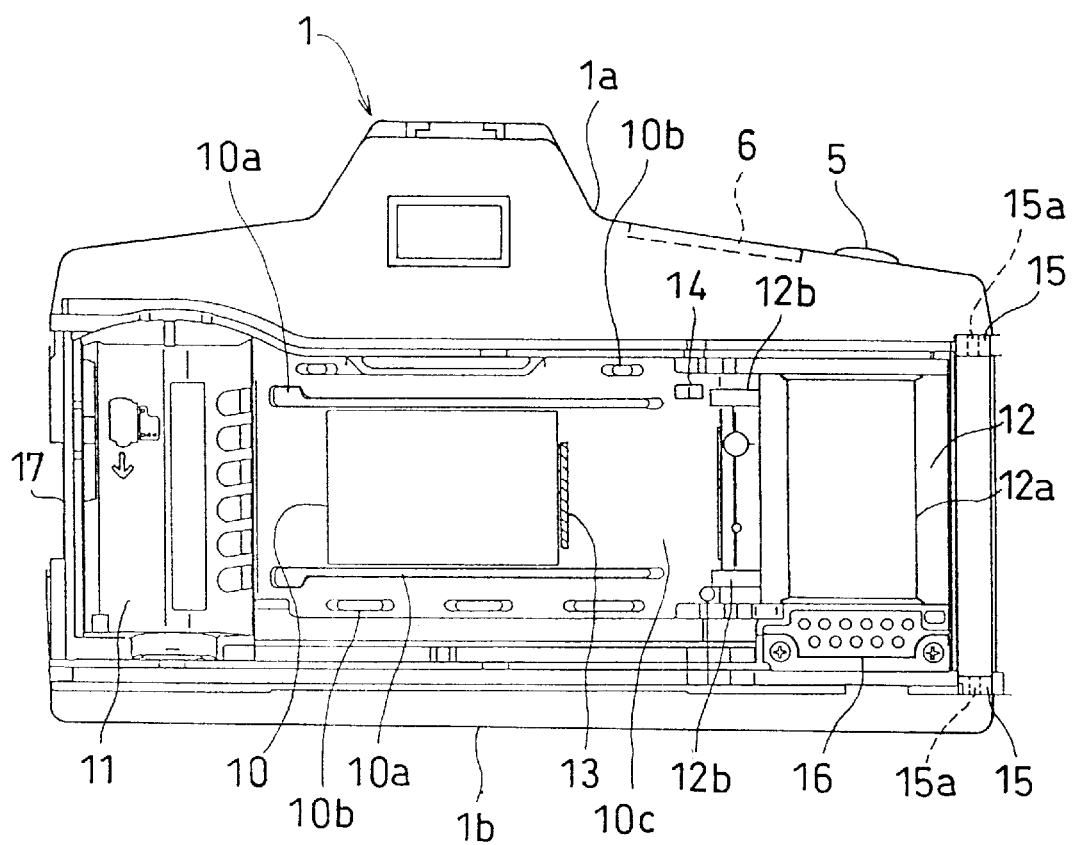
FIG. 1 is a rear view of a camera in accordance with an embodiment of this invention when a rear cover thereof is opened.
Figure 2:
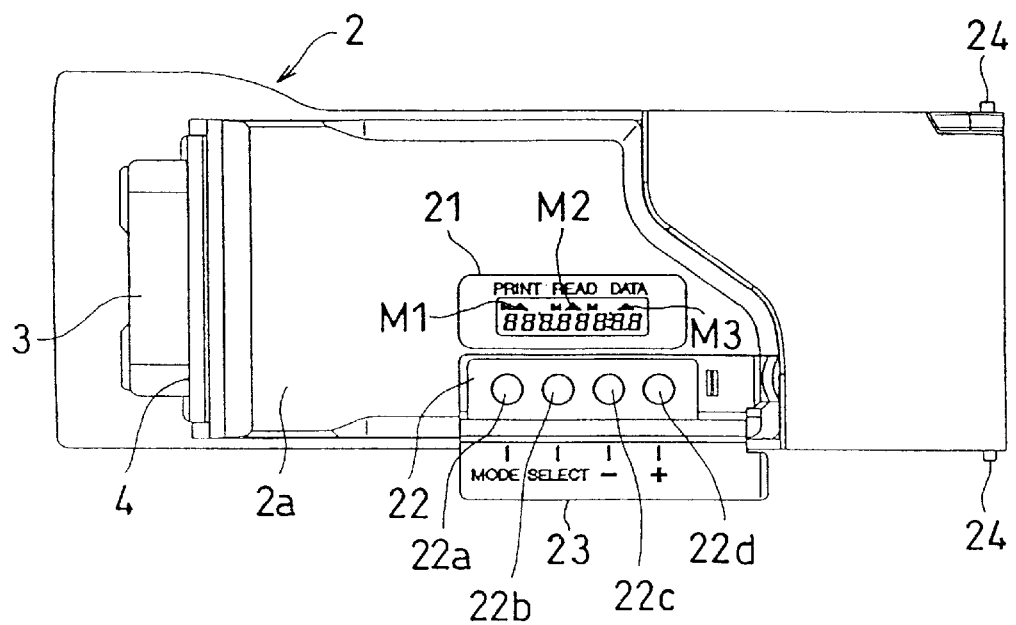
FIG. 2 is a rear view of the rear cover of the camera shown in FIG. 1.
Figure 3:
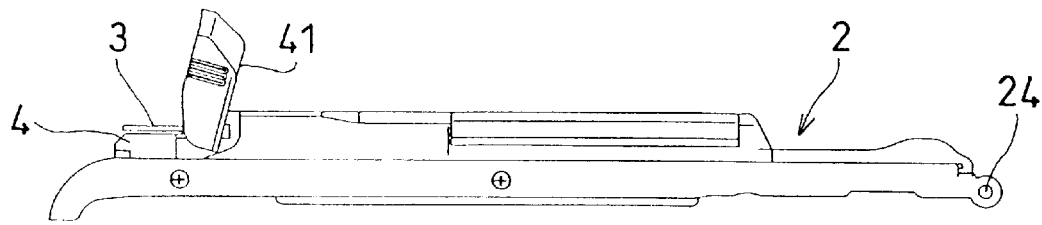
FIG. 3 is a bottom view of the rear cover.
Figure 4:
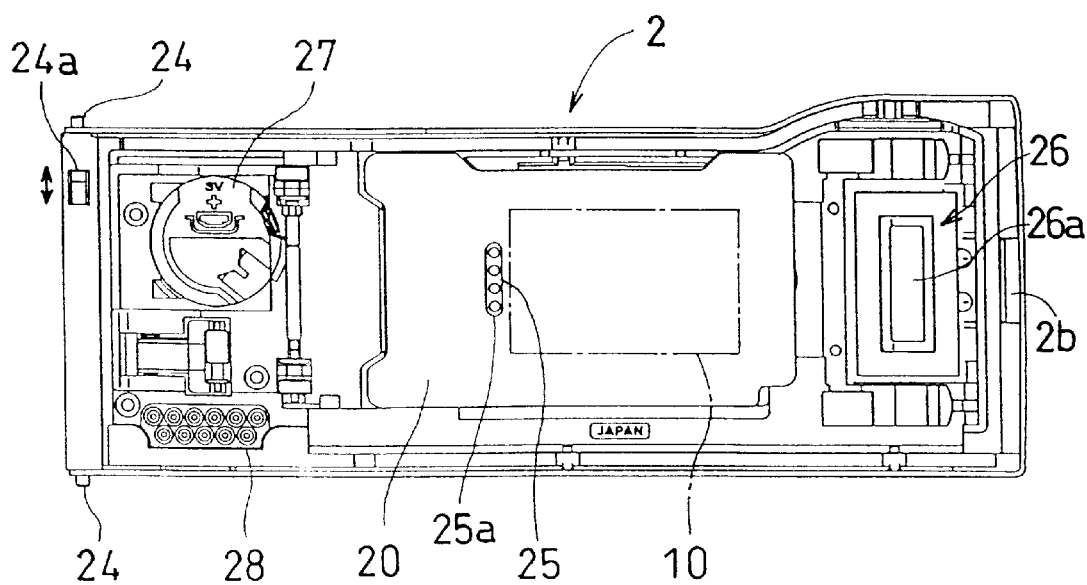
FIG. 4 is a front view of the rear cover.

FIG. 1 shows a rear view of a single lens reflex (SLR) camera as an embodiment of the camera in accordance with this invention. In FIG. 1, a rear cover of the camera is not illustrated. FIGS. 2 to 4 shows an interchangeable rear cover of the camera. As can be seen from FIGS. 1 to 4, the camera is configured by a main body 1 and an interchangeable rear cover 2.

As shown in FIG. 1, a rectangular opening 10 through which a film is exposed is disposed substantially at the center of the main body 1. The shape and the size of the rectangular opening 10 govern a frame to be exposed on the film. A pair of film guide rails 10a and a plurality of protrusions 10b are formed above and below of the rectangular opening 10. Details of the film guide rails 10a and the protrusions 10b will be described below. A focal plane shutter mechanism, a mirror box with a moving mirror for reflecting light beams to a view finder, a focusing sensor, a focusing control mechanism, and an interchangeable taking lens are provided in front of or above the rectangular opening 10, which are not illustrated in the figure because of obvious in the art. A view finder and a photo-sensor of an exposure control circuit are provided above the rectangular opening 10.

A shutter release button 5 and a display 6 such as LCD are provided on an upper surface 1a of the main body 1. When the shutter release button 5 is pushed down to a middle position, a first switch S1 (see FIG. 6) is turned on and the exposure control circuit starts to sense a luminance of an object by the photo-sensor, and the focusing mechanism starts to measure a distance to the object by the focusing sensor. Furthermore, the focusing mechanism moves the taking lens for focusing an image of the object on the focal plane. When the shutter release button 5 is fully pushed down, a second switch S2 (see FIG. 6) is turned on and the exposure control circuit controls an aperture diaphragm to a predetermined size and controls the focal plane shutter mechanism to expose a film in a predetermined exposure time. Thus, a fine latent image of the object is formed on the film.

A film cartridge chamber 11, into which a drum shaped cartridge of a film can be contained, is formed at left side of a chassis of the main body 1. A film winding chamber 12 is formed at right side of the chassis of the main body 1. A drum shaped film winding spool 12a is provided substantially at the center of the film winding chamber 12. The film winding spool 12a has an array of sprockets in the vicinity of upper end and/or lower end of the drum shaped surface (not shown in the figure). The sprockets are formed at a predetermined interval for engaging with perforations P of a film F (see FIG. 5). Thus, the film F is firmly wound around the film winding spool 12a. A pair of rollers 12b for smoothly guiding movement of the film F is provided in a vicinity of an end of the film winding chamber 12 in downstream side of the film winding motion. A perforation sensor 14 is provided in the vicinity of the upper roller 12b and further in downstream side of the film winding motion for facing perforations P of the film F. The perforation sensor 14 is, for example, a photo-interrupter for sensing the passage of the perforation P by using the difference of reflection ratios or transmission ratios of the perforation portion and the other portion of the film F. Since the perforation sensor 14 is not restricted by the optical sensor, a mechanical switch can be used as the perforation sensor 14. A hatched region 13 in FIG. 1 faces an optical writing device 25 shown in FIG. 4. Details of the optical writing device 25 is described below.

A pair of bearings 15 with a bearing hole 15a serving as a part of detachable hinge is provided at right end of the chassis of the main body 1. A shaft 24 of the rear cover 2 (see FIG. 3) can be inserted into the bearing holes 15a, so that the rear cover 2 can rotatively be borne by the bearings 15. An array of a predetermined number of female connectors 16 is provided below the film winding spool 12a for supplying electric energy from the main body 1 to the rear cover 2 and for transmitting data between the main body 1 and the rear cover 2 and for supplying electric power to the rear cover 2 from the main body 1. A lock 17 for locking the closed state of the rear cover 2 by hooking a hook 2b (see FIG. 4) of the rear cover 2 is formed at left end of the chassis of the main body 1.

A film winding and rewinding mechanism is provided in the bottom space 1b of the main body 1. The film winding and rewinding mechanism includes a fork provided in the bottom of the film cartridge chamber 11 for engaging with a spool of a film cartridge, a gear train for rotating the fork, a planet gear for switching transmission of driving force from a motor between the gear train and the film winding spool 12a. The motor is, for example, disposed inside space of the film winding spool 12a. This mechanism is not illustrated in the figure because it is conventionally known in the art.

As shown in FIG. 2, a display 21 such as LCD (liquid crystal display) and control switch panel 22 are provided on a rear face 2a of the rear cover 2. The display 21 includes an array of segment indicators for indicating date, time and so on, and a plurality of marks M1 to M3 having a triangular shape. The display 21 is turned on when one of image taking mode for exposing images on the film, reading mode for reading data from an external recording medium such as a memory card and displaying mode for recording data in the external recording medium is selected. The mode which is selected can be distinguished from other modes by combination of switching on of the marks M1 to M3. The control switch panel 22 includes a mode setting button 22a, a selecting button 22b, a forwarding button 22c and a backing button 22d. When the mode setting button 22a is pushed one by one, one of contents such as film number, frame number, shutter speed, aperture number, and so on is cyclically displayed on the display 21. The selecting button 22b is pushed when the content to be displayed on the display 21 is changed. When the forwarding button 22c or the backing button 22d is pushed, the changeable contents such as the shutter speed and the aperture number is increased or decreased one step by one. The control switch panel 22 has a rotatably hinged cover 23 for covering the buttons 22a to 22d.

A memory card recorder 4 is provided at left side on the rear surface 2a of the rear cover 2. The memory card recorder 4 has a structure into which a memory card 3 is detachably inserted. When the memory card 3 is inserted, it is connected to internal terminals T1 and T2 of a main control circuit (see FIG. 5). The memory card recorder 4 has a rotatably hinged cover 41 for covering the memory card 3 (see FIG. 3). The memory card 3 is a nonvolatile storage memory such as a flash memory, and preferably has a memory capacity of 2 to 8 Mbytes which can storage data for one hundred to several hundreds of films.

A pair of pins 24 are provided, for example, at left end in FIG. 4 for protruding from top and bottom end of the rear cover 2. When the pins 24 are engaged with the bearing holes 15a of the bearings 15, the rear cover 2 is rotatably hinged. As can be seen from FIG. 4, the upper pin 24 has a sliding mechanism 24a along its axial direction in a manner so that the upper pin 24 can be moved into the inside of the rear cover 2. Thereby, the rear cover 2 is detachable.

As can be seen from in FIG. 4 showing the front view of the rear cover 2, a pressure plate 20 is provided substantially the center of the front face thereof. When the rear cover 2 is closed, the pressure plate 20 contacts the protrusions 10b of the main body 1 (see FIG. 1). Heights of the film guide rails 10a from a face 10c of the frame of the main body 1 is lower than that of the protrusions 10c. The film is held and moved between the space of the film guide rails 10a and the pressure plate 20 for making a frame portion of the film facing the rectangular opening 10 substantially be flat. An opening 25a is formed on the pressure plate 20 through which the above-mentioned optical writing device 25 can face the film. The optical writing device 25 is positioned at upstream portion in the film winding motion with respect to the rectangular opening 10. In this embodiment, the optical writing device 25 has a predetermined number, for example, eight of light emitting devices arranged in a direction perpendicular to the film winding direction. Each light emitting device has, for example, a matrix array of minute LEDs (light emitting diodes) for forming an 8-letter shaped segment for exposing a numeral or a letter on the film. Four circles illustrated in FIG. 4 are focusing lenses respectively corresponding to two light emitting devices.

A film cartridge pressure 26 is provided at right side in FIG. 4 of the rear cover 2 for facing the film cartridge chamber 11 of the main body 1 when the rear cover 2 is closed. Thereby, the film cartridge is immovably held in the film cartridge chamber 11. An opening 26a is formed at position substantially the center of the film cartridge pressure 26 on the rear cover 2 through which the existence of the film cartridge can visibly be confirmed.

A disc shaped backup battery 27 for generating, for example, 3 V of voltage is detachably provided in a cavity facing the film winging space 12 of the main body 1 when the rear cover 2 is closed for supporting the data stored in a memory in the rear cover 2 from dropping down of voltage of a main battery in the main body 1.

An array of male connectors 28 is provided for facing the array of female connectors 16 of the main body 1 when the rear cover 2 is closed. When the rear cover 2 is closed, each male connector 28 is connected to the female connector 16. Thereby, electric power can be supplied to the rear cover 2 from the main body 1 and data can be transmitted between the main body 1 and the rear cover 2.

Figure 5:
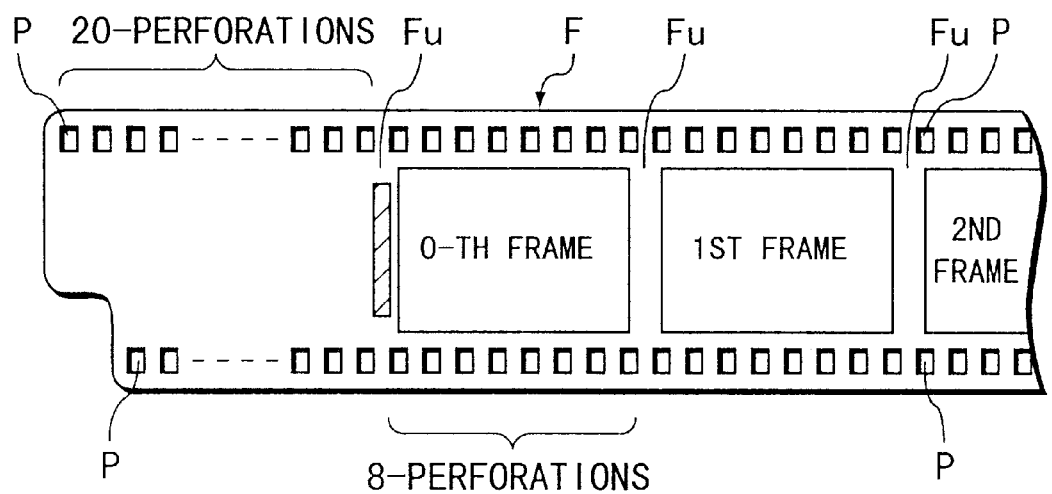
FIG. 5 is a front view of an example of a film which is usable in the camera.

An example of a film used in the camera is shown in FIG. 5. Perforations P are formed in the vicinities of both sides of the film F at a predetermined interval along the lengthwise direction from the front end to the rear end. In this embodiment, a length corresponding to eight perforations is used for one frame. An initial frame (shown as 0-th frame in the figure) is instituted for starting from a position corresponding to a predetermined number, for example, twenty of perforations from the top end of the film. Serially, a first frame, a second frame, . . . are instituted at an interval corresponding to eight perforations via non-exposed regions Fu. Generally, the film can be exposed a predetermined number of frames such as 12, 24 and 36. Film winding quantity for positioning the frames including the 0-frame at a position facing the rectangular opening 10 is controlled by counting the number of perforations passing the perforation sensor 14.

Figure 6:
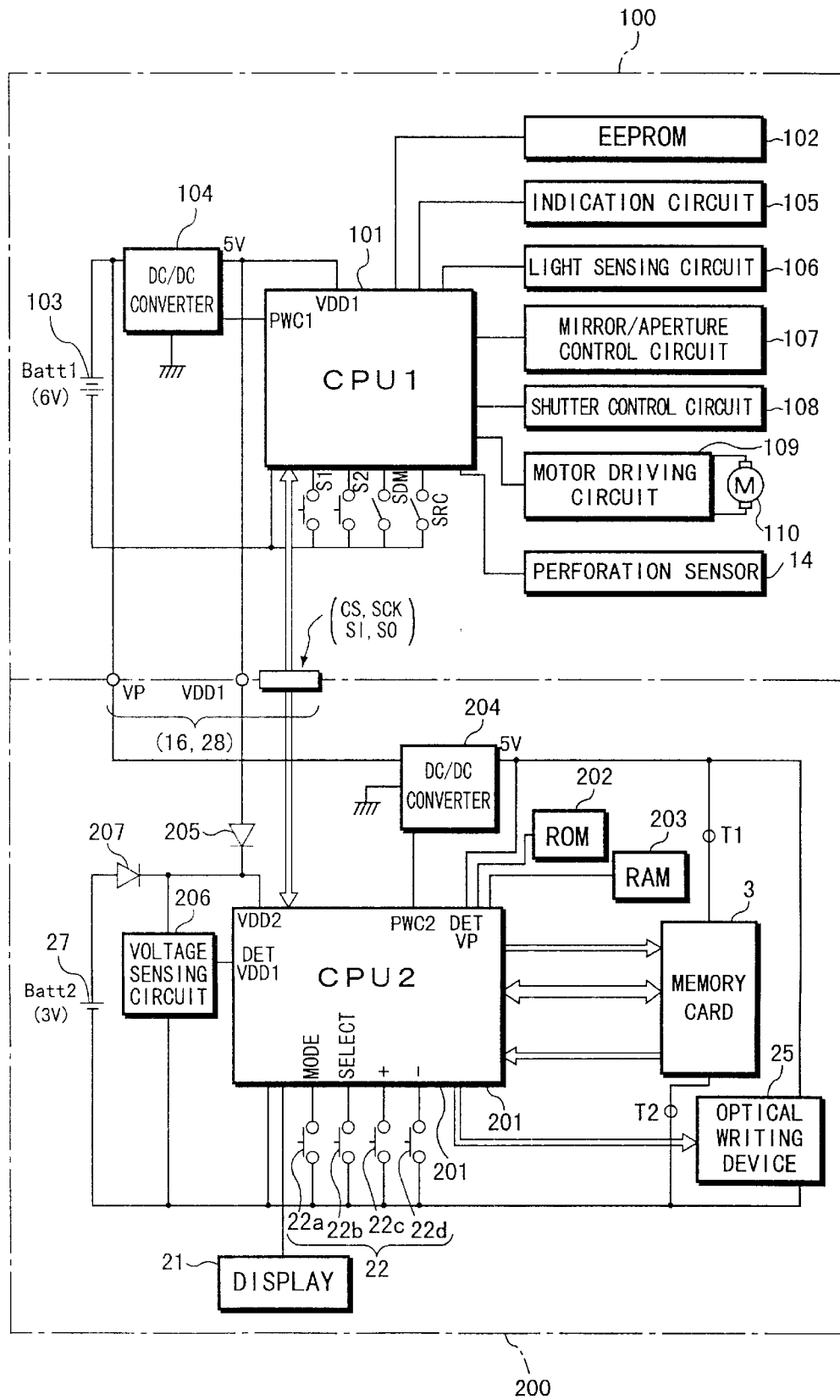
FIG. 6 is a block diagram of a main control circuit of the camera.

A block diagram of the main control circuit of the camera is shown in FIG. 6. In FIG. 6, a first circuit 100 is provided in the main body 1 and a second circuit 200 is provided in the rear cover 2.

A first central processing unit (hereinafter abbreviated as first CPU (CPU1)) 101 controls operation of each block in the first circuit 100 and includes a memory 102 such as EEPROM (electric erasable programmable read only memory) for storing processing programs with respect to the operations of the camera and recording data with respect to the image taking information, if necessary. An electric power supply 103 such as an interchangeable dry battery or a chargeable battery supplies an original voltage, for example, 6 V. A DC/DC converter 104 converts the original voltage 6 V from the electric power supply 103 to a first driving voltage, for example, 5 V by which the first CPU 101 can be driven, and the converted first driving voltage is supplied to a terminal VDD1 of the first CPU 101. It is preferable that the DC/DC converter 104 includes a constant-voltage circuit for stably supplying the first driving voltage to the first CPU 101. The DC/DC converter 104 starts to operate, when a signal having a high level (H-level) is inputted to a terminal PWC1 of the first CPU 101.

The first switch S1 turns on for preparing image taking operation, when the shutter release button 5 is pushed down to a middle position. The second switch S2 turns on for taking up an image on the film, when the shutter release button 5 is fully pushed down. A selecting switch SDM is turned on for recording the data with respect to the image taking information in the memory card 3. A cover switch SRC such as a mechanical switch or an optical switch is turned on and off corresponding to opening and closing of the rear cover 2.

An indication circuit 105 controls the display 6 on the top surface 1a of the main body 1 for indicating the image taking information, number of exposed frames, battery condition, and so on. A light sensing circuit 106 senses a luminance of an object by a photo-sensor. When the luminance of the object is sensed, the first CPU 101 calculates an aperture number and an exposure time corresponding to the luminance of the object by using a predetermined program. In a TTL (through the lens) type SLR camera, a part of light beams from the object is reflected by the moving mirror for being introduced to the photo-sensor provided in the vicinity of the view finder. A mirror/aperture control circuit 108 controls the moving mirror for shunting from an optical path between the taking lens and the focal plane shutter and controls the aperture diaphragm of the taking lens for taking the predetermined aperture number when the second switch S2 is turned on further to turning on of the first switch S1. A shutter control circuit 108 controls the focal plane shutter for exposing the film by the predetermined exposure time after shunting of the moving mirror. A motor driving circuit 109 outputs driving signals for rotating a motor 110 in a predetermined direction for winding the film and in an opposite direction for rewinding the film. Winding and rewinding of the film is switched by changing polarity of the voltage applied to the motor 110.

A second CPU (CPU2) 201 controls operation of each block in the second circuit 200 and includes a ROM (read only memory) 202 for storing processing programs shown in FIGS. 7 to 13 described below and a RAM (random access memory) 203 for temporarily storing the data with respect to image taking information. As examples of the image taking information, a controlled exposure time (shutter speed), a controlled aperture number, an open aperture F number of the taking lens, an exposure control mode such as aperture priority mode, shutter speed priority mode and manual mode, on/off information of a flash, a location where the image was taken, date and/or time when the image was taken, and so on can be enumerated. The information stored in the memory is not restricted by the above-enumeration. Furthermore, it is possible that all of the enumeration are stored. Alternatively, it is possible that important ones of the enumeration are stored.

The first CPU 101 and the second CPU 201 are connected by the connectors 16 and 28 when the rear cover 2 is closed, so that data can be transmitted can be transmitted between the first CPU 101 and the second CPU 201. The first driving voltage can be supplied to a terminal VDD2 of the second CPU 201 from the electric power supply 103 via the DC/DC converter 104 and a diode 205. The original voltage of the electric power supply 103 is directly supplied to a DC/DC converter 204. That is, the connectors 16 and 28 respectively comprises a terminal VP for supplying the original voltage 6 V of the electric power supply 103, a terminal VDD1 for supplying the first driving voltage 5 V from the DC/DC converter 104, four terminals CS, SCK, SI and SO for transmitting the data between the first CPU 101 and the second CPU 201. The terminal CS is used for transmitting chip selection signals which selects a control object among the circuits 102 to 109 and the second CPU 201. The terminal SCK is used for transmitting clock pulses for controlling the timing of the data transmission. The terminals SI and SO are respectively used for inputting and outputting the data. In this embodiment, eight lines (8-bits parallel lines) are assigned.

The memory card 3 is connected to the second CPU 201 via memory card recorder 4. The memory card recorder 4 and the second CPU 201 are connected by a control signal line, a data bas line and an insert signal line. Furthermore, the optical writing device 25 is connected to the second CPU 201 by writing signal lines.

The second CPU 201 converts the image taking information with respect to each frame on the same film to the same data file and temporarily records the data file in the RAM 203. The first CPU 101 transmits the writing signals such as a film number which is to be exposed on the 0-th frame and a frame number which can optionally be exposed on the non-exposed region between the frames to the optical writing device 25. Furthermore, the first CPU 101 executes film winding operation for winding the film by a predetermined length by counting the perforations passing the perforation sensor 14 and executes film rewinding operation for rewinding the film into the film cartridge when the final frame is exposed or when a rewinding switch (not shown in the figure) is turned on before the final frame is exposed.

The DC/DC converter 201 provided in the second circuit 200 of the rear cover 2 converts the original voltage 6 V supplied from the terminal VP to a second driving voltage, for example, 5 V. The second driving voltage is inputted to the second CPU 201 through a terminal DETVP for detecting the voltage of the second driving voltage. The second driving voltage is further supplied to the memory card recorder 4 through terminals T1 and T2 and to the optical writing device 25. The DC/DC converter 204 starts the converting operation when a signal having a high level (H-level) is inputted to a terminal PWC2 of the second CPU 201.

The first driving voltage which is converted by the DC/DC converter 104 is inputted to the VDD2 terminal of the second CPU 201 and a voltage sensing circuit 206 through the diode 205. The voltage sensing circuit 206 senses the voltage of the first driving voltage, so that it outputs a high level (H-level) signal to a terminal DETVDD1 of the second CPU 201 when the driving voltage is equal to or higher than 4 V and outputs a low level (L-level) signal to the terminal DETVDD1 when the driving voltage is lower than 4 V. Generally, the second CPU 201 can be moved when the driving voltage is equal to or higher than 3 V. When the sensing level of the voltage sensing circuit 206 is set to be 4 V, the drop down of the first driving voltage which is normally 5 V due to the drop down of the original voltage of the electric power source (battery) 3 can be detected sufficiently before immovability of the second CPU 201. The backup battery 27 is connected to the terminal VDD2 of the second CPU 201 and the voltage sensing circuit 206 through a diode 207.

Operations of the camera is described with reference to flowcharts shown in FIGS. 7 to 13. In the figures, the flows illustrated in left side and designated by a symbol "S" are executed by the first CPU 101 of the main body 1, and the flows illustrated in right side and designated by a symbol "#" are executed by the second CPU 201 of the rear cover 2.

Figure 7:
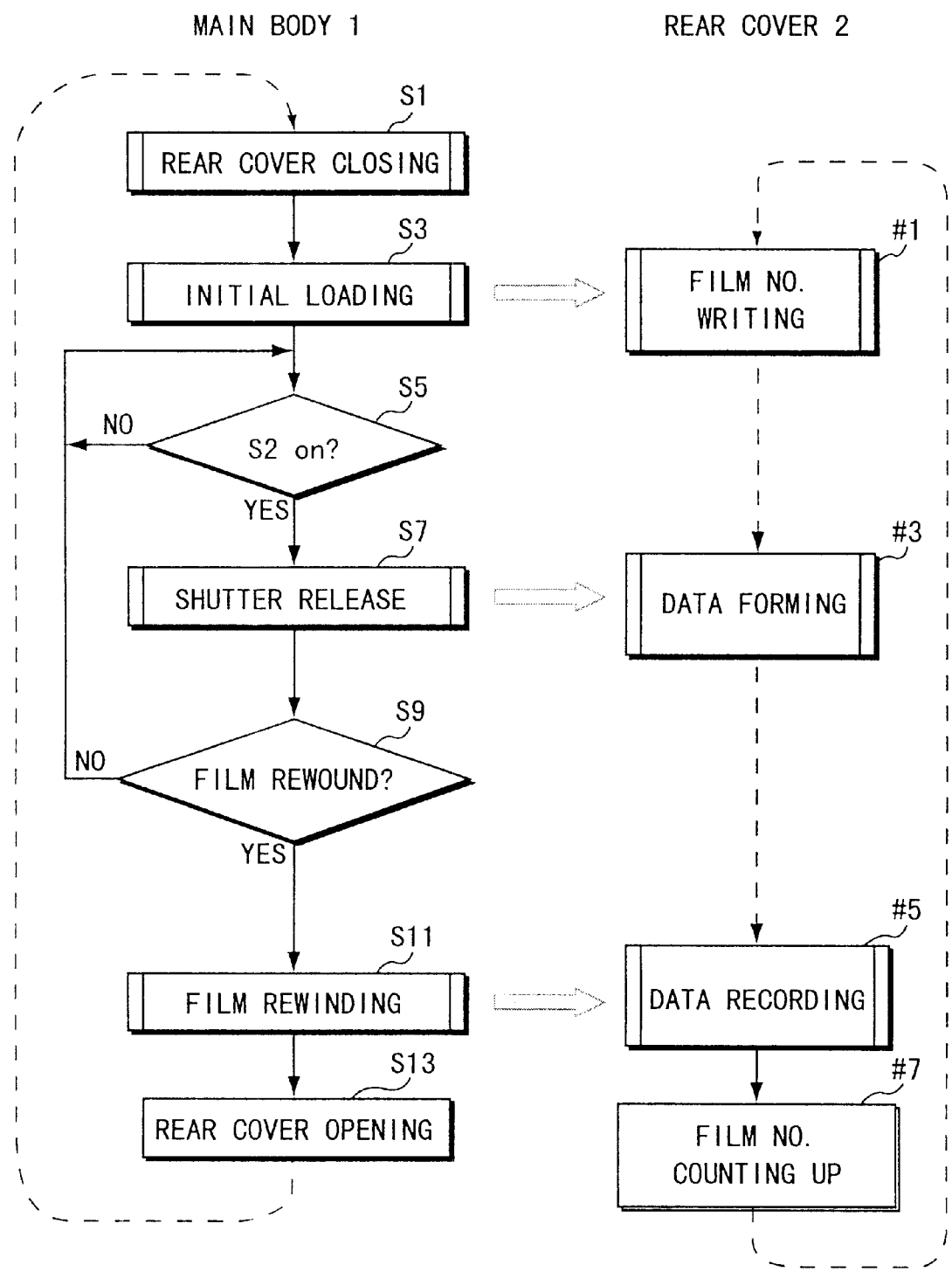
FIG. 7 is a flow chart showing a main routine of the operation of the camera.

FIG. 7 shows a main routine of the operation of the camera. When the rear cover 2 is closed, the first CPU 101 senses turning on of the cover switch SRC and operates "rear cover closing" process (step S1). Subsequently, the first CPU 101 executes "initial loading" process (step S3). While the rear cover closing process and the initial loading process are executed, predetermined signals are transmitted between the first CPU 101 and the second CPU 201, so that the second CPU 201 executes "film number writing" process (step #1). Details of the film number writing process is described below with reference to FIGS. 8 and 9.

Subsequently, the first CPU 101 waits until the second switch S2 is turned on (No in step S5). When the second switch S2 is turned on (Yes in step S5), the first CPU 101 executes "shutter release" process (step S7). While the shutter release process is executed, predetermined signals are transmitted between the first CPU 101 and the second CPU 201, so that the second CPU 201 executes "data forming" process (step #3). During the memory data forming process, the image taking information which are to be recorded in the memory card 3 are temporarily stored in the RAM 203.

When the shutter release process is completed, the first CPU 101 judges whether the film is to be rewound or not (step S9). When a predetermined number of frames are completely exposed o the film or when the rewind switch is turned on, the film will be rewound. When the first CPU 101 judges the film is not to be rewound (No in step S9), the first CPU 101 returns to the step S5 and executes the steps S5 and S7 with respect to the next frame. When the first CPU 101 judges the film is to be rewound (Yes in step S9), the first CPU 101 executes "film rewinding " process (step S11). While the film rewinding process is executed, predetermined signals are transmitted between the first CPU 101 and the second CPU 201, so that the second CPU 201 executes "data recording" process (step #5). During the data writing process, the second CPU 201 reads the image taking information temporarily stored in the RAM 203 and records them in the memory card 3. Subsequently, the second CPU 201 increases (counts up) a counting number of the exposed film (film number) by one for forming an inherent data of a film which will be exposed on next film (step #7). After that, the first CPU 101 judges whether the rear cover 2 is opened or not by the cover switch SRC. When the rear cover 2 is opened, the first CPU 101 executes "rear cover opening" process (step S13) for resetting all the initial data and returns to the step S1.

Figure 8:
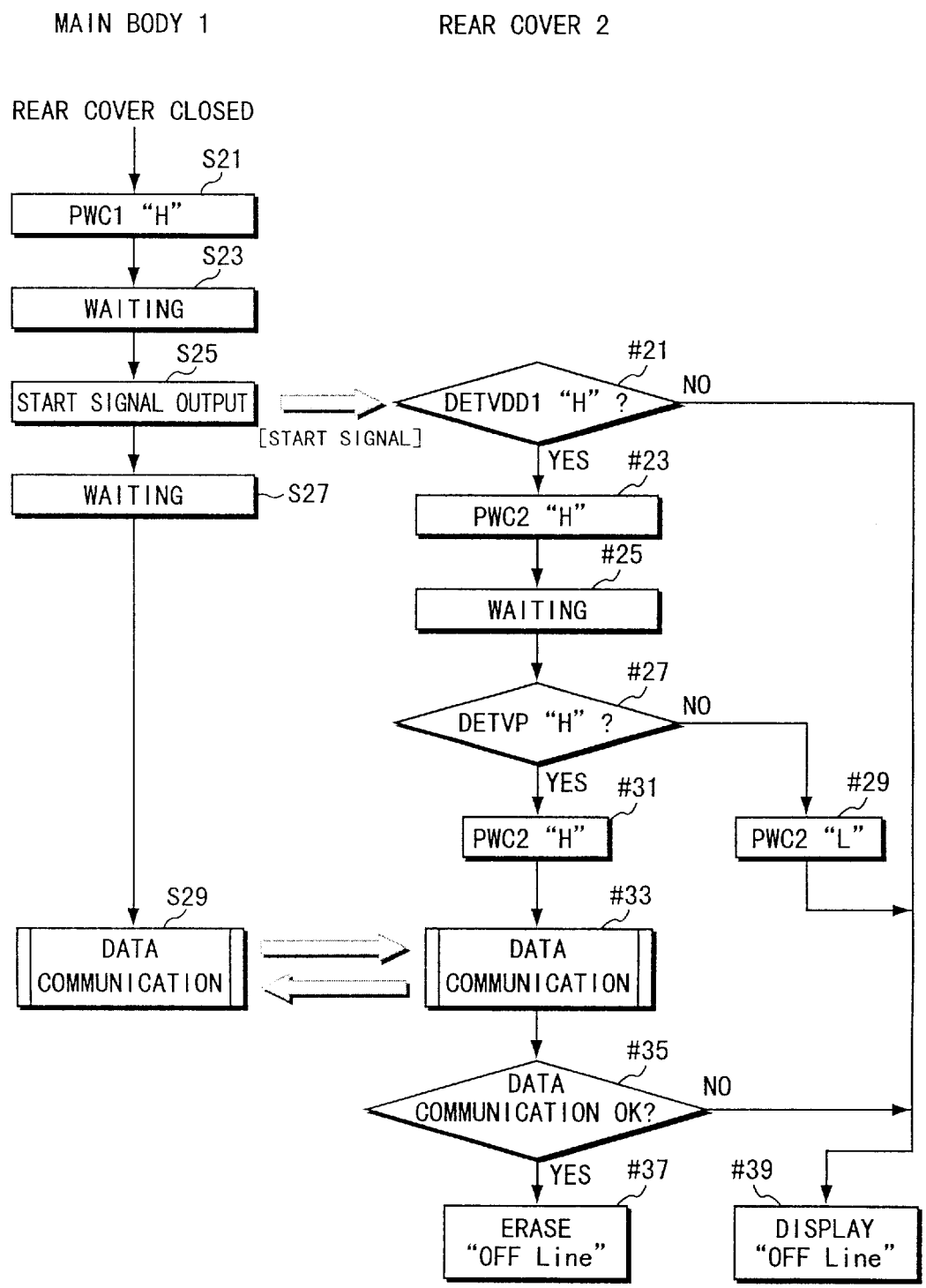
FIG. 8 is a flowchart showing a subroutine for closing the rear cover.

FIG. 8 shows a subroutine of the rear cover closing process in the step S1. When the rear cover 2 is closed, the first CPU 101 outputs a H-level signal to the terminal PWC1 (PWC1 "H") for staring up the DC/DC converter 104 (step S21). The first CPU 101 waits a predetermined waiting time until the driving voltage of the DC/DC converter 104 becomes stable (step S23). When the driving voltage of the DC/DC converter 104 becomes stable, the first CPU 101 outputs a start signal to the second CPU 201 (step S25). After that, the first CPU 101 waits another predetermined time for receiving a response from the second CPU 201 (step S27).

When the second CPU 201 receives the starting signal, it judges whether the H-level signal is inputted to the DETVDD1 terminal from the voltage detecting circuit 206 which shows the driving voltage equal to or larger than 4 V (step #21). When the H-level signal is inputted (Yes in step #21), the second CPU 201 outputs the H-level signal to the terminal PWC2 (PWC2 "H") for starting up the DC/DC converter 204 (step #23). The second CPU 201 waits a predetermined waiting time until the driving voltage of the DC/DC converter 204 becomes stable (step #25). After passing the waiting time, the second CPU 201 judges whether the H-level signal is inputted to the terminal DETVP or not for confirming that the voltage of the second driving voltage from the DC/DC converter 204 is equal to or higher than 4 V (step #27). When the H-level signal is not inputted to the terminal DETVP (No in step #27), the second CPU 201 judges that the DC/DC converter 204 is troubled, and outputs the L-level signal to the terminal PWC2 (PWC2 "L") for stopping the operation of the DC/DC converter 204 (step #29).

On the other hand, when the H-level signal is inputted to the terminal DETVP (Yes in step #27), the second CPU 201 continues to output the H-level to the terminal PWC2 (PWC2 "H") for continuing the operation of the DC/DC converter 204 (step #31). Subsequently, the first CPU 101 and the second CPU 201 executes a data communication test (steps S29 and #33). The second CPU 201 judges whether the data communication test is normally completed or not (step #35). When the data communication test is normally completed, the second CPU 201 erases "OFF LINE" displayed on the display 21 when the main switch of the camera is turned on (step #37). On the other hand, when the data communication test is abnormally finished, the second CPU 201 continues to display the "OFF LINE" on the display 21 for alarming the occurrence of the error to the user (step #39).

Figure 9:
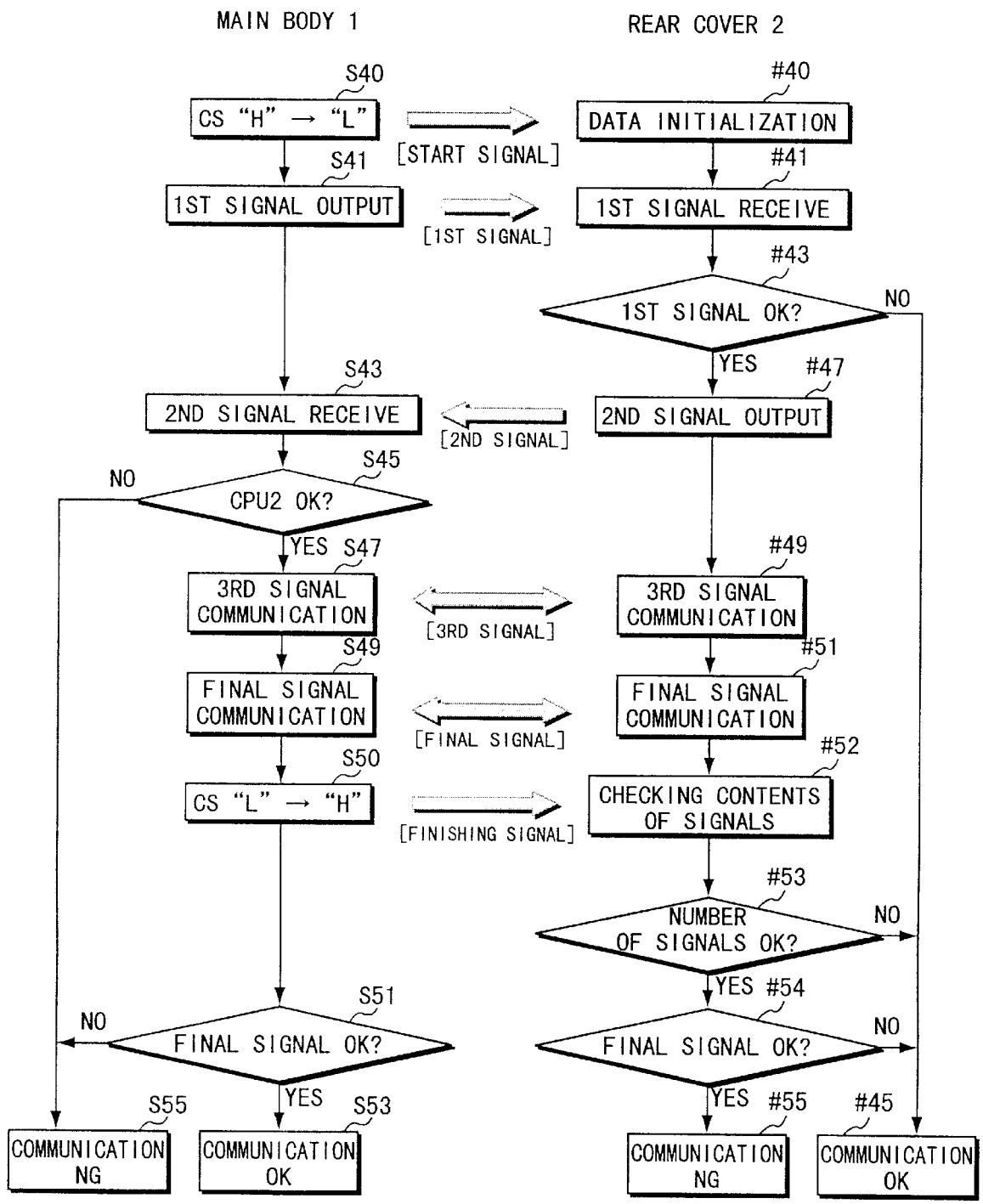
FIG. 9 is a flowchart showing a subroutine of "communication" between steps of #33 and S29.

FIG. 9 shows a subroutine of the data communication test between the first CPU 101 and the second CPU 201 in the steps of S29 and #33. This subroutine is executed for confirming the lines connected by the terminals CS, SCK, SI and SO of the connectors 16 and 28 are electrically (normally) connected or not by communicating predetermined test data between the first CPU 101 and the second CPU 201.

At first, the first CPU 101 changes a level of a chip selection signal CS from H-level to L-level (step S40), and outputs the chip selection signal CS as a start signal to the second CPU 201 for starting the data communication test. When the terminal CS is normally connected, the second CPU 201 can receive the start signal from the first CPU 101. When the second CPU 201 receives the start signal, it initializes data (data initialization) with respect to the data communication test (step #40).

Subsequently, the first CPU 101 transmits a first signal (first check data) to the second CPU 201 (step S41). When the second CPU 201 receives the first signal from the first CPU 101 (step #41), it judges whether the first signal coincides with the predetermined first check data or not (first signal OK?: step #43). When the first signal from the first CPU 101 does not coincide with the first check data, it is regarded that the connectors 16 and 28 are not connected normally (communication NG), so that the second CPU 201 finishes the data communication test as communication NG (step #45). On the other hand, when the first signal from the first CPU 101 coincides with the first check data, the second CPU 201 transmits predetermined second signal (second check data) to the first CPU 101 for showing that the second CPU 201 has received the first signal (step #47).

When the first CPU 101 receives the second signal (step S43), it judges whether the rear cover 2 includes the second circuit 200 with the second CPU 201 or not (CPU2 OK?: step S45). Hereupon, another rear cover with no CPU is optionally usable. When such the rear cover with no CPU is hinged on the main body 1, the first signal cannot received by the CPU, and the second signal may not be outputted. Thus, the first CPU 101 can not receive the second signal. When the first CPU 101 receives no data from the second CPU 201 (No in step S45), the first CPU 101 finishes the data communication test as communication NG (step S55).

Alternatively, when the first CPU 101 receives the second signal from the second CPU 201 (Yes in step S45), the first CPU 101 outputs a third signal and a final signal to the second CPU 201 for confirming the connection of all the connectors 16 and 28 (steps S47 and S49). When the second CPU 201 receives the third signal and the final signal, it outputs predetermined response data corresponding to the third and final signal (steps #49 and #51).

When the data communication of the final signal is completed, the first CPU 101 changes the chip select signal CS from L-level to H-level, and outputs the changed chip select signal CS as a finishing signal to the second CPU 201 for finishing the data communication test (step S50). Subsequently, the first CPU 101 judges whether the final signal from the second CPU 201 coincides with the predetermined final test data (final signal OK) or not (step S51). When the final signal from the second CPU coincides with the final check data (Yes in step S51), the first CPU 101 judges that the data communication between the first CPU 101 and the second CPU 201 is properly completed (communication OK), and completes this flow (step S53). Alternatively, when the final signal from the second CPU does not coincide with the final check data (No in step S51), the first CPU 101 judges that the data communication between the first CPU 101 and the second CPU 201 is abnormal (communication NG), and finishes this flow (step S55).

When the second CPU 201 receives the finishing signal, it starts to check the contents of the signals from the first CPU 101 (step #52). Concretely, the second CPU 201 checks the number of received signals from the first CPU 101. In this embodiment, the second CPU 201 receives three signals (first, third and final signals). Thus, the second CPU judges whether the number of the signals is proper (number of signals OK?) or not (step #53). When the number of signals is proper (Yes in step #53) the second CPU judges whether the final signal is proper or not (final signal OK?: step #54). When the final signal is proper (Yes in step #54), the second CPU 201 judges that the data communication between the first CPU 101 and the second CPU 201 is properly completed (communication OK), and completes this flow (step #55). Alternatively, when the number of the signals is not proper (No in step #53) or the final signal is not proper (No in step #54), the second CPU 201 judges that the data communication between the first CPU 101 and the second CPU 201 is abnormal (communication NG), and finishes this flow (step #45).

The fact that the first CPU 101 receives the second signal from the second CPU 201 means the followings. The first signal is properly transmitted to the second CPU 201 from the first CPU 101 through the terminal SO by using clock pulses. The second CPU 201 executes a predetermined process when it receives the first signal and outputs the second signal. The second signal is properly transmitted to the first CPU 101 from the second CPU 201 through the terminal SI by using the clock pulses. The first signal (first check data) and the second signal (second check data) are respectively, for example, one byte data, and the contents of them are previously set. When the second signal from the second CPU 201 does not coincide with the second check data, there are possibilities that the connection of the connectors 16 and 28 are improperly connected, the second CPU 201 is troubled, and the rear cover has no CPU.

The third signal and the final signal are respectively the data with respect to the image taking information such as the shutter speed, and the aperture number. By using such the data, it is possible to check the operation of the second CPU 201. When the signal from the first CPU 101 is the data which cannot be existed in this system, for example, FF or 00, the second CPU 201 judges that the data communication between the first CPU 101 and the second CPU 201 is interrupted due to abnormal connection of the connectors 16 and 28. When the signal from the second CPU 201 is the data which cannot be existed in this system, the first CPU 101 judges the same.

When the data communication test between the first CPU 101 and the second CPU 201 is properly completed, the step #39 in FIG. 8 is executed. Alternatively, when the data communication test is improperly finished, the step #37 in FIG. 8 is executed.

The connection of the connectors 16 and 28 can be confirmed with respect to not only the above-mentioned terminals CS, SCK, SI and SO, but also the terminals VP and VDD1. When the terminal VP is normally connected, the original voltage 6 V of the electric power supply 103 is supplied to the terminal VP, so that the second driving voltage 5 V is outputted from the DC/DC converter 204. It is possible to judge the connection of the terminal VP by sensing the voltage applied to the terminal DETVP of the second CPU 201 from the DC/DC converter 204. When the terminal VDD1 is normally connected, the first driving voltage is applied to the second CPU 201 from the DC/DC converter 104. It is possible to judge the connection of the terminal VDD1 by sensing the voltage inputted to the terminal VDD2 of the second CPU 201. Since the voltage is sensed by the voltage sensing circuit 206, the second CPU 201 can judge the connection by reading the result of the sensing from the terminal DETVDD1.

Figure 10:
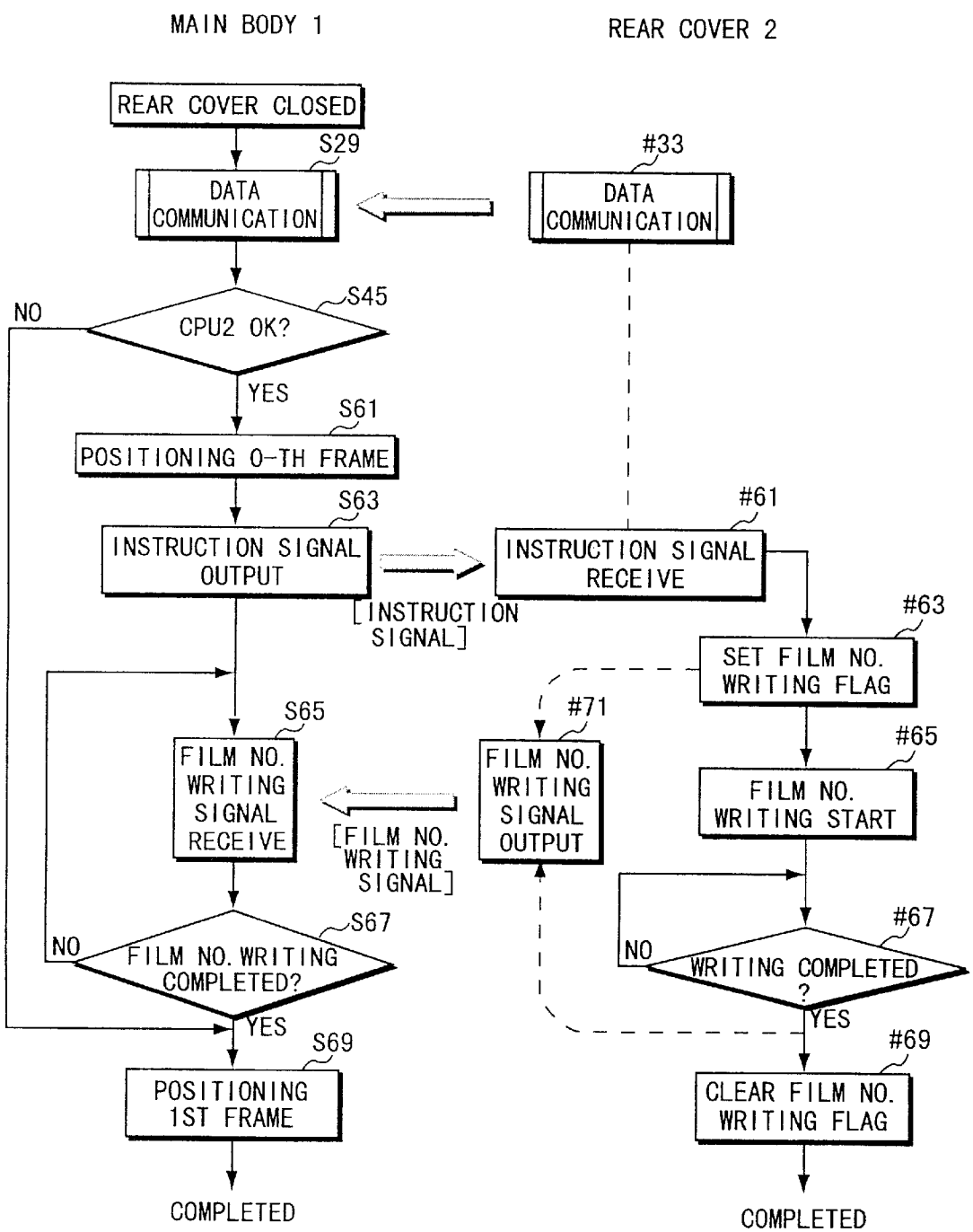
FIG. 10 is a flowchart for showing a subroutine of "initial loading" in step S3.

FIG. 10 shows a subroutine of the initial loading in the step S3. This subroutine of the initial loading is executed responding to the above-mentioned data communication in the steps S29 and #33. When the first CPU 101 receives the second signal from the second CPU 201 (Yes in step S45), the motor driving circuit 109 executes the positioning of the front end of the 0-th frame by counting the output signal of the perforation sensor 14 by a predetermined number, for example, one among 20 to 27 (step S61). Subsequently, the first CPU 101 transmits an instruction signal for exposing a film number on a film to the second CPU 201 (step S63).

When the second CPU 201 receives the instruction signal (step #61), the second CPU 201 sets a film number writing flag for showing film number has been written or exposed (step #63). Subsequently, the second CPU 201 outputs a film number previously formed to the optical writing device 25 as a writing signal so as to start the film number writing (step #65). When the film number writing operation is completed (Yes in step #67), the second CPU 201 clears the film number writing flag (step #69) and completes this flow. The second CPU 201 intermittently transmits a film number writing signal at a predetermined interval to the first CPU 101 while the steps #63 to #69 are executed (step #71).

When the first CPU 101 receives the film number writing signal from the second CPU 201 (step S65), it founds that the film number has been written or exposed on the film. When the second CPU 201 clears the film number writing flag in the step #69, the film number writing signal will not be transmitted to the first CPU 101 from the second CPU 201. Thus, the first CPU 101 can judges whether the film number writing operation has been completed or not (step S67). When the film number writing operation is completed (Yes in step S67), the first CPU 101 positions the front end of the 1st frame by winding the film by a predetermined length corresponding to, for example, eight perforations from position of the 0-th frame for standing by the exposure of an image (step S69), and completes this flow. During this initial loading operation, an inherent film number can be exposed at a preferable position on the 0-th frame on the film.

Table 1 shows relations between the film number exposed on the 0-th frame and a file name recorded in the memory card 3. In table 1, symbols of 1st, 2nd, 3rd, . . . in boxes below a box of "Order" designate the order number of the films exposed by this camera system. Symbols of "exist" and "not exist" in boxes below a box of "Card" designate the memory card 3 is inserted into the memory card recorder 4 or not. Symbols of "ON" and "OFF" in boxes below a box of "Memory" correspond to on and off of the selecting switch SDM. When the selecting switch SDM is turned on, the exposure of the film number on the film is instructed. Alternatively, when the selecting switch SDM is turned off, the exposure of the film number on the film is not instructed. As can be seen from table 1, the same number such as 0001, 0002, . . . are used as the film number and the file name. When memory off is instructed, the file number is not recorded. However, when the memory card 3 is not inserted into the memory card recorder 4 and memory on is instructed (see the film number of 5-th), the file number is stored in the EEPROM 102 in the main body 1. The second CPU 201 records the file name in the memory card 3 corresponding to the contents of table 1.

TABLE 1

| Order | Card | Memory | Film No. | File Name | EEPROM |
| --- | --- | --- | --- | --- | --- |
| 1st | Exist | ON | 0001 | 0001 | — |
| 2nd | Exist | ON | 0002 | 0002 | — |
| 3rd | Exist | ON | 0003 | 0003 | — |
| 4-th | Exist | OFF | 0004 | — | — |
| 5-th | Not Exist | ON | 0005 | — | 0005 |
| 6-th | Not Exist | OFF | 0006 | — | — |
| 7-th | Exist | ON | 0007 | 0007 | — |

Figure 11:
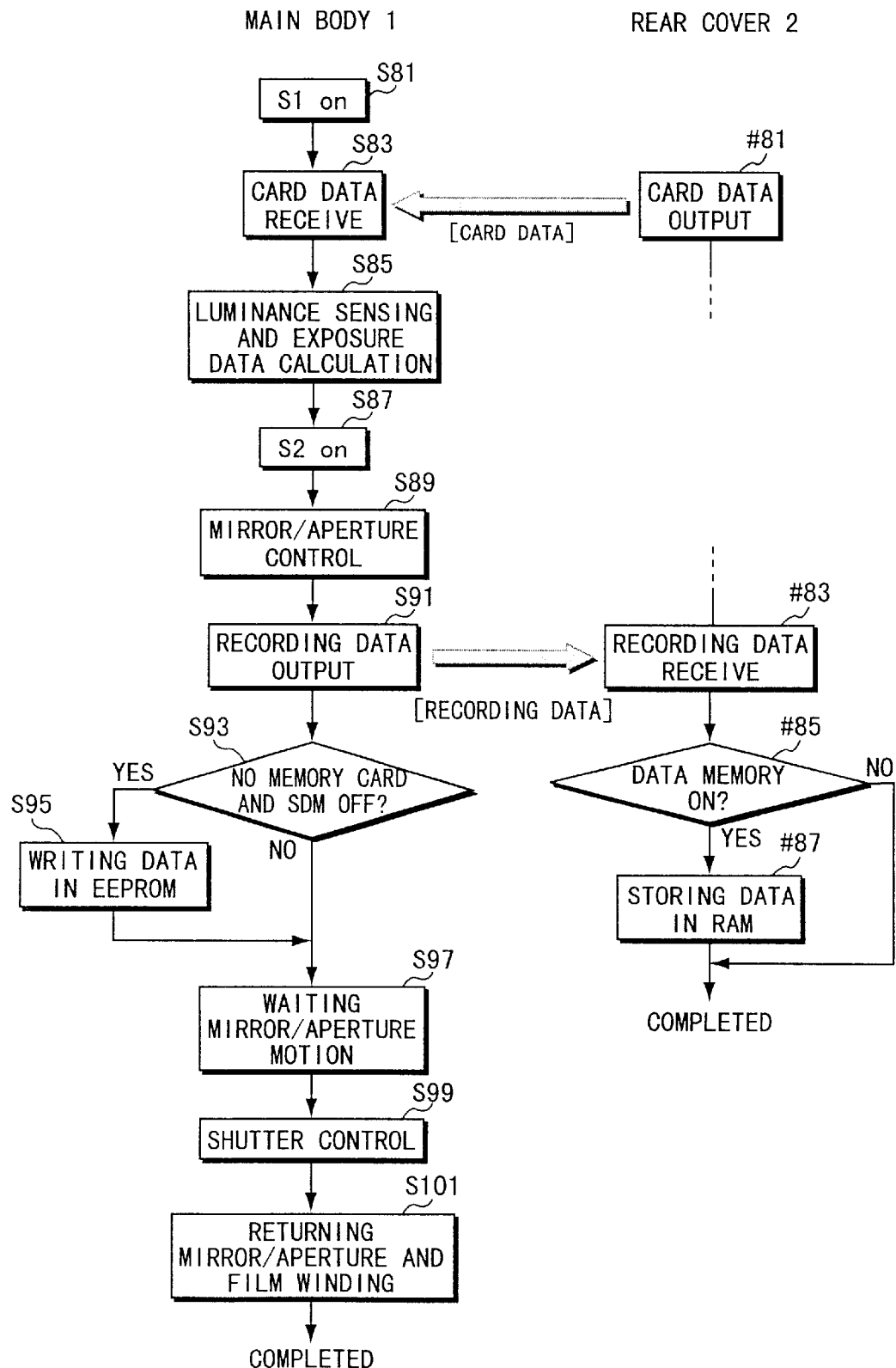
FIG. 11 is a flowchart for showing a subroutine of "shutter release" in step S7.

FIG. 11 shows a subroutine of the shutter release operation in the step S7. When the first switch S1 is turned on (step S81), the second CPU 201 outputs a card data showing the existence or non-existence of the memory card 3 to the first CPU 101 (step #81). When the first CPU 101 receives the card data (step S83), it temporarily stores the data of the file number in the EEPROM 102. Subsequently, the first CPU 101 executes the luminance sensing operation of the object and calculates exposure data such as the shutter speed and the aperture number as preparations of the image taking operation (step S85).

Furthermore, when the second switch S2 is turned on (step S87), the first CPU 101 controls the mirror/aperture control circuit 107 for shunting the moving mirror from the optical path and for controlling the aperture diaphragm to be the predetermined size corresponding to the calculated aperture number so as to expose the film (step S89). At this time, the image taking information such as the shutter speed and the aperture number has been decided, so that the first CPU 101 transmits recording data such as switching on or off of the memory card selected by the selecting switch SDM, instruction for forming the data and the image taking information to the second CPU 201 (step S91). When the second CPU 201 receives the recording data from the first CPU 101 (step #83), it judges whether the memory card 3 is inserted into the memory card recorder 4 (data memory on) or not (step #85). When the memory card 3 is inserted into the memory card recorder 4 (Yes in step #85), the second CPU 201 temporarily stores the recording data with respect to just exposed frame into the RAM 203 (step #87). Thereby, the operations with respect to the frame are completed. The image taking information with respect to each frame on the same film is converted to a data of file style and serially stored in the same data file having the file name corresponding to the film number of the film in the camera into the RAM 203.

Table 2 shows an example of recording condition of each frame. In table 2, symbols of 1st, 2nd , 3rd, in boxes below a box of "Order" designate the order of frames on the same film. Symbols of "exist" and "not exist" in boxes below a box of "Card" designate the memory card 3 is inserted into the memory card recorder 4 or not. Symbols of "ON" and "OFF" in boxes below a box of "Memory" correspond to on and off of the selecting switch SDM.

When the memory card 3 exists and the selecting switch SDM is turned, the image taking information with respect to the frame is recorded in the memory card 3. The case that the image taking information is recorded in the memory card 3 or the EEPROM 102 of the main body 1 is designated by a symbol "○" in table 2. When the memory card 3 exists but the selecting switch SDM is turned off, the image taking information with respect to the frame are not recorded not only in the memory card 3 but also the EEPROM 102. The case that the image taking information is not recorded is designated by a symbol "×" in table 2. On the other hand, when the memory card 3 does not exist but the selecting switch SDM is turned on, the image taking information with respect to the frame is recorded in the EEPROM 102 for saving from the forget of the insertion of the memory card 3.

TABLE 2

| Order | Card | Memory Card | | EEPROM |
|---|---|---|---|---|
| 1st | Exist | ON | ○ | X |
| 2nd | Exist | ON | ○ | X |
| 3rd | Exist | ON | ○ | X |
| 4-th | Exist | OFF | X | X |
| 5-th | Not Exist | ON | X | ○ |
| 6-th | Not Exist | OFF | X | X |
| 7-th | Exist | ON | ○ | X |

The first CPU 101 judges whether the memory card 3 is not inserted into the memory card recorder 4 and the selecting switch SDM is turned on or not by using the data with respect to the existence of the memory card in the step S83 (step S93). When the memory card 3 is not inserted into the memory card recorder 4 and the selecting switch SDM is turned on (Yes in step S93), the first CPU 101 stores the data to be recorded in the EEPROM 102 of the main body 1 instead of recording them in the memory card 3 (step S95). On the other hand, when the memory card 3 is inserted into the memory card recorder 4 or the selecting switch SDM is turned on (No in step S93), the first CPU 101 waits until the motions of the moving mirror and the aperture diaphragm are completed (step S97). After that, the first CPU 101 controls the shutter control circuit 108 for exposing the film during the predetermined exposure time (step S99). After exposing the film, the first CPU 101 controls the mirror/aperture control circuit 107 for returning the moving mirror and the aperture diaphragm to initial positions, and controls the motor driving circuit 109 for winding the film by a length corresponding to one frame by monitoring the output signal from the perforation sensor 14 (step S101). When the film is wound, the first CPU 101 completes this routine.

Figure 12:
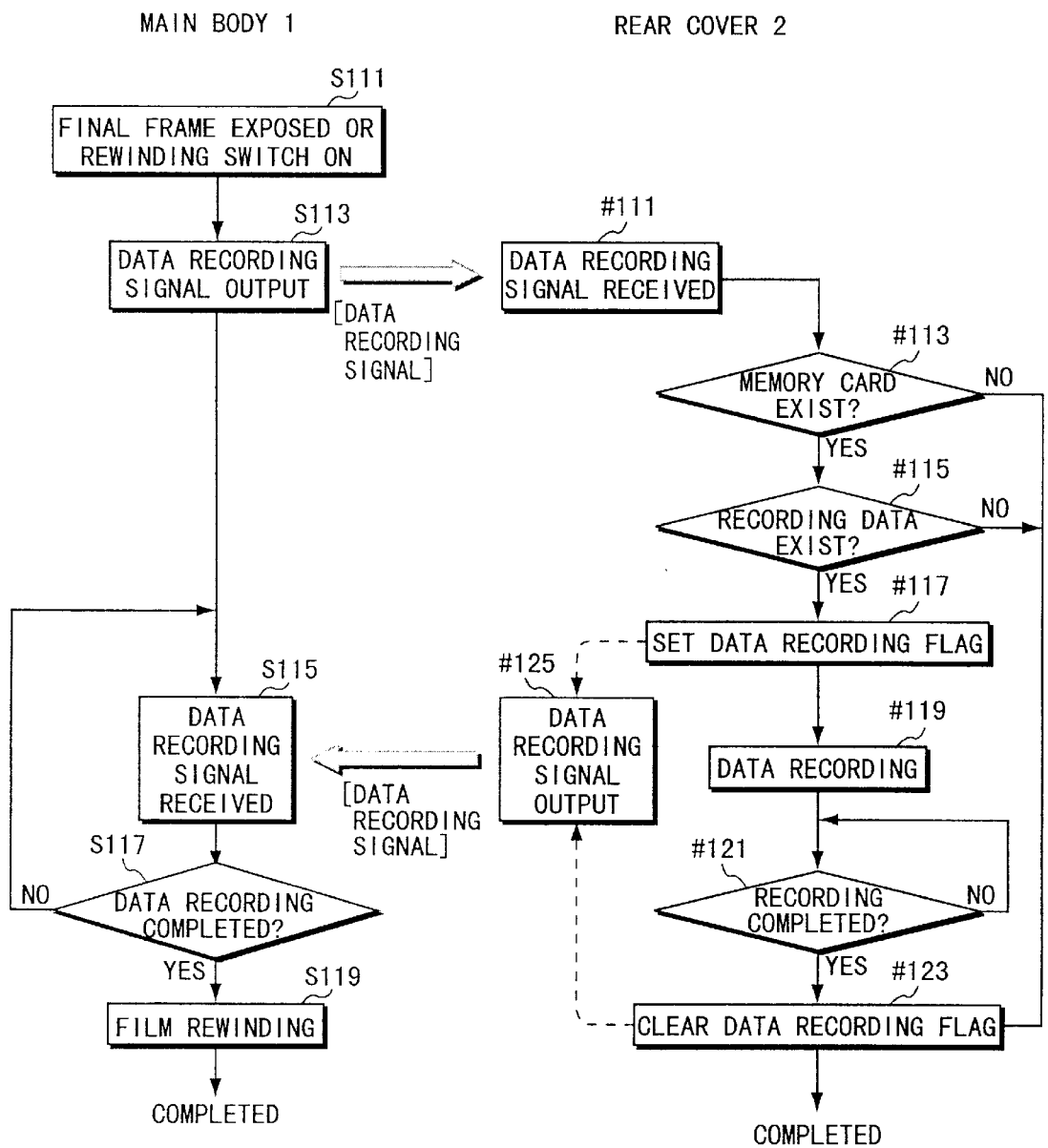
FIG. 12 is a flowchart for showing a subroutine of "rewinding" in step S11.

FIG. 12 shows a subroutine for rewinding the film in the step S11. When the final frame on the film is exposed or the rewinding switch is turned on (step S111), the rewinding flow is executed. At first, the first CPU 101 transmits a data recording signal to the second CPU 201 (step S113). When the second CPU 201 receives the data recording signal (step #111), it judges whether the memory card 3 is inserted into the memory card recorder 4 (memory card exist?) or not (step #113). When the memory card exists (Yes in step #113), the second CPU 201 judges whether the recording data to be recorded exist in the RAM 203 or not (step #115). When the recording data exist in the RAM 203 (Yes in step #115), the second CPU 201 sets a data recording flag (step #117), and the data with respect to image taking information of each frame stored in the ram 203 are recorded together in the same data file in the memory card 3 (step #119). Subsequently, the second CPU 201 judges whether the data recording is completed or not (step #121). When the data recording is completed (Yes in step #121), the second CPU 201 clears the data recording flag off (step #123), and completes this flow.

The second CPU 201 intermittently transmits a data recording signal for showing the data recording operation to the first CPU 101 at a predetermined interval while the steps #117 to #123 are executed. By receiving the signal from the second CPU 201, the first CPU 101 can confirm that the data has been recorded in the memory card 3 and judge whether the data recording is completed or not (step S117). When the signal from the second CPU 201 is not received, the first CPU 101 judges that the data recording is completed and it controls the motor driving circuit for rewinding the film into the film cartridge (step S119). After that, the first CPU 101 completes this flow.

Figure 13:
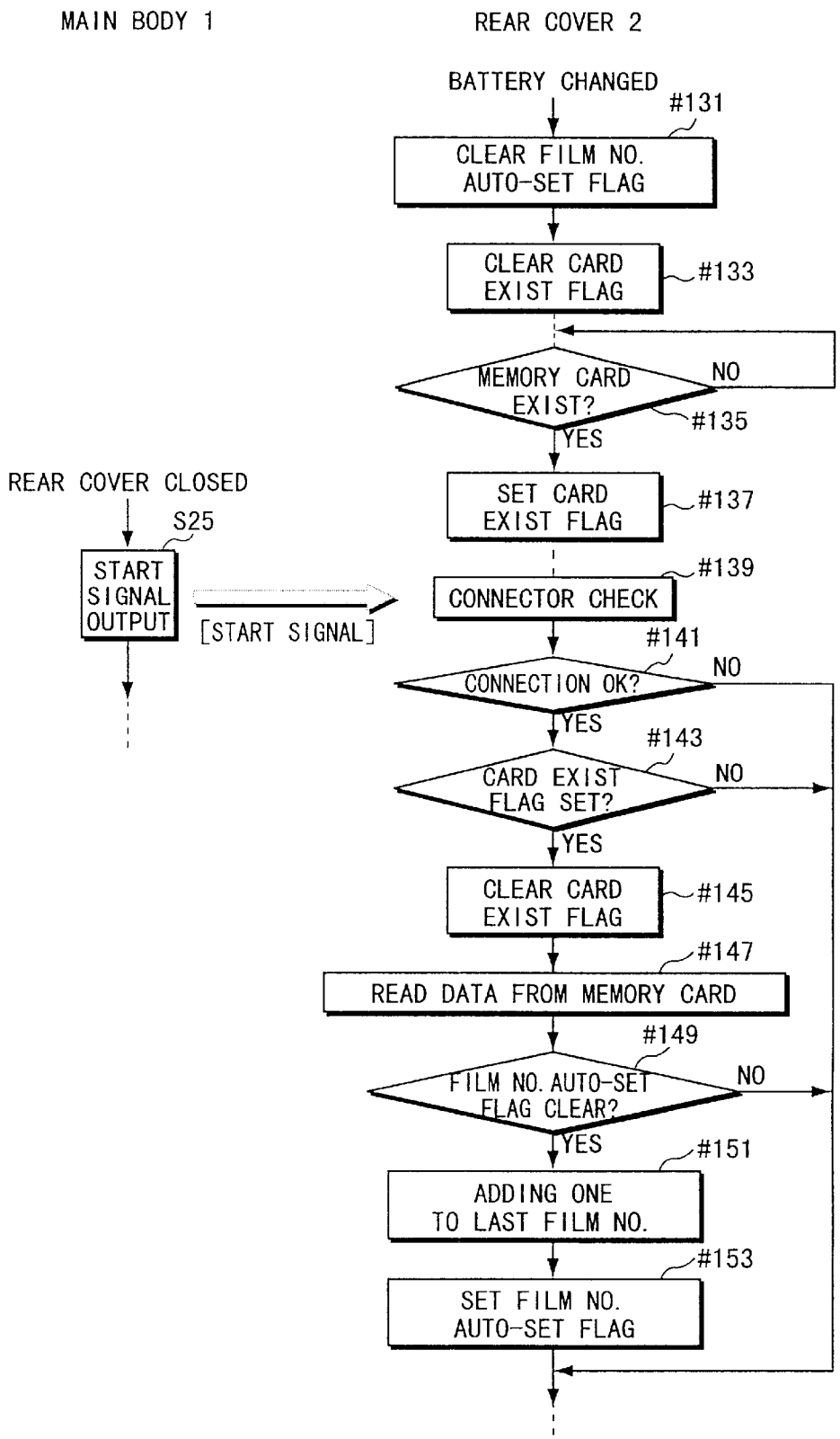
FIG. 13 is a flowchart for showing a routine for automatically setting a film number.

FIG. 13 shows a subroutine for automatically setting the film number. Since the backup battery 27 is provided inside the rear cover 2, it is necessary to open the rear cover 2 for changing the backup battery 27 under the condition that the connectors 16 and 28 are disconnected. That is, the data stored in the RAM 203 are erased when the backup battery 27 is changed. Thus, it is necessary to set a new film number by using the last film number recorded in the memory card 3. This flow starts when the backup battery 27 is changed.

When new backup battery 27 is mounted, the second CPU 201 clears a film number auto-set flag (step #131). At this time, it is not found whether the memory card 3 is inserted into the memory card recorder 4 or not. Thus, the second CPU 201 clears a card exist flag (step #133). Subsequently, the second CPU 201 judges whether the memory card 3 is inserted into the memory card recorder 4 (memory card exist?) or not (step #135). When the memory card 3 exists (Yes in step #135), the second CPU 201 sets the card exist flag (step #137).

Under executing at least the steps #131 and #133, when the rear cover 2 is closed after changing the backup battery 27, the rear cover closing subroutine is executed and the start signal is transmitted from the first CPU 101 to the second CPU 201 (step S25 in FIG. 8). Responding to the start signal, the second CPU 201 executes the data communication test shown in FIGS. 8 and 9 (step #139) and it judges whether the connection of the connectors 16 and 28 is normal or not (step #141).

When the connection of the connectors 16 and 28 is confirmed as normal (Yes in step #141), the second CPU 201 judges whether the card exist flag is set or not (step #143). When the card exist flag is set (Yes in step #143), the second CPU 201 clears the card exist flag (step #145) and reads the data from the memory card 3 (step #147). Subsequently, the second CPU 201 judges whether the film number auto-set flag is cleared or not (step #149). When the film number auto-set flag is cleared (Yes in step #149), the second CPU 201 adds one to the last film number read from the memory card in the step #147 for forming a new film number (step #151). After that, the second CPU 201 sets the film number auto-set flag (step #153), and completes this flow. When the connection of the connectors 16 and 28 is abnormal (No in step #141), or when the memory card 3 is not inserted (No in step #143), it is impossible to form a new film number from the data read from the memory card 3, so that the second CPU 201 passes the following steps. When the film number auto-set flag is cleared (No in step #149), it is possible to form a new film number from the data stored in the RAM 203, so that the second CPU 201 passes the following steps.

In the above-mentioned embodiment, the memory card recorder 4 and the optical writing device 25 are provided on the rear cover 2. By such a configuration, it is possible to apply this invention to a conventional camera system without the memory card recorder by changing the conventional rear cover to the rear cover of the above-mentioned embodiment. Alternatively, it is possible to provide the memory card recorder 4 and/or the optical writing device 25 in the main body 1. By such a configuration, the rear cover can be downsized or the protrusion of the rear cover can be shorten.

In the above-mentioned embodiment, the film number is optically exposed on the 0-th frame which is set before the 1st frame. However, it is not restricted by the embodiment. It is possible to expose the film number at optional region before the 1st frame which is not exposed.

In the above-mentioned embodiment, the film number is optically exposed on the film by the optical writing device 25. However, the method for writing or marking the film number on the frame is not restricted by the optical method. A mechanical method such as punching minute holes and printing ink dots for forming letters or numerals can be used for visibly writing or marking the film number. The writing or marking direction of the film number is not restricted by a direction perpendicular to the direction of the film winding motion. The film number can be written or marked in an optional direction, for example, along the direction of the film winding motion. Furthermore, it is possible to stop the film at a position of the 0-th frame while the initial loading of the film for writing or marking the film number on the film.

Furthermore, the inherent information such as the film number written or marked on a film does not necessarily coincide with the file name recorded in the memory card. It is sufficient to have a predetermined relation between them by which the data can directly be read out from the memory card by using the film number. Furthermore, the inherent information is not restricted by the numeral. It is possible letter, symbol or combinations of the numeral and them.

In the above-mentioned embodiment, the new film number is formed when the backup battery 27 is changed. However, it is not restricted by the embodiment. It is possible to form a new film number when the film is rewound, the rear cover is opened, or the rear cover is closed.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera for exposing an image of an object in each frame on a film comprising:
   an information marking device for marking an inherent information of the film in a predetermined region on the film; and
   an output device for outputting frame information with respect to each frame and film information related to the inherent information recorded on the film.

2. The camera in accordance with claim 1, further comprising a memory for storing the frame information and the film information outputted from the output device.

3. A camera comprising:
   a memory;
   an input device for inputting frame information with respect to each frame on a film into a file in the memory;
   an information marking device for marking an inherent information of the film in a predetermined region on the film; and
   a recording device for recording film information related to the inherent information into the file in the memory.

4. The camera in accordance with claim 3, wherein the inherent information marked on the film is changed with respect to each film.

5. A camera comprising:
   a memory;
   an input device for inputting frame information with respect to each frame on a film into a file in the memory;
   an information marking device for visibly marking an inherent information selected from film number and name in a predetermined region on the film after developing the film; and
   a recording device for recording inherent information marked on the film into the file in the memory.

6. A camera for exposing an image of an object in a frame on a film and recording image taking information with respect to image taking operation into a memory comprising:
   a marking information deciding circuit for deciding a content of an information to be marked on the film;
   an information marking device for visibly marking the information in a predetermined region on the film;
   a recording device for recording the image taking information in a file corresponding to each film in the memory; and
   a file name adding circuit for adding a file name corresponding to the information marked on the film to the file.

7. The camera in accordance with claim 6, wherein the information to be marked on the film is formed with respect to each film when the film is changed.

8. The camera in accordance with claim 6, wherein an external memory holder is further comprised and the memory is an external memory detachable from the external memory holder.

9. The camera in accordance with claim 8, wherein the external memory holder is provided on a rear cover of the camera.

10. The camera in accordance with claim 8, wherein a judging circuit for judging whether the external memory is inserted into the external memory holder or not is further comprised and the recording device records the image taking information in the external memory only when the judging circuit judges the external memory is inserted.

11. The camera in accordance with claim 10, wherein an internal memory is further comprised and the image taking information is recorded in the internal memory when the judging circuit judges the external memory is not inserted.

12. The camera in accordance with claim 6, wherein the marking information deciding circuit includes an internal memory and a backup battery for supplying backup voltage to the internal memory, and it generates a new marking information by using an information recorded in an external memory when data stored in the internal memory are lost due to drop down of the backup voltage.

13. The camera in accordance with claim 12, wherein the drop down of the backup voltage is caused by cutting off of the electrical connection between the backup battery and the marking information deciding circuit.

14. The camera in accordance with claim 12, wherein the drop down of the backup voltage is caused by consumption of the backup battery.

15. The camera in accordance with claim 6, wherein the information marking device is optically exposing the information in a region on the film which is not exposed by light.

16. The camera in accordance with claim 6, wherein the information marked on the film is serially arranged numerals, letters, symbols or combination of them.

17. A recorder detachable from a main body for exposing an image of an object in each frame on a film comprising:
- a marking information deciding circuit for deciding a content of an information to be marked on the film; and
- a recording device for recording an image taking information with respect to each frame and the information decided by the marking information deciding circuit with a predetermined relation in a memory.

18. The recorder in accordance with claim 17 constituting a camera when the recorder is attached to the main body.

19. The recorder in accordance with claim 18, wherein the recorder serves as a rear cover of the camera.

20. A camera system for taking an object on a film and recording an information with respect to image taking process comprising:
- a marking information deciding circuit for deciding a content of an information to be marked on the film;
- an information marking device for visibly marking the information in a predetermined region on the film;
- an external memory;
- a recording device for recording the image taking information in a file corresponding to each film in the external memory; and
- a file name adding circuit for adding a file name corresponding to the information marked on the film to each data file which files file data.

* * * * *